(No Model.) 2 Sheets—Sheet 1.

H. C. LOWRIE.
WASH BOWL.

No. 327,094. Patented Sept. 29, 1885.

Attest:
Philip F. Larner
Howell Batte

Inventor:
Harvey C. Lowrie
By Wm C Wood
Attorney.

N. PETERS, Photo-Lithographer, Washington, D. C.

(No Model.) 2 Sheets—Sheet 2.
H. C. LOWRIE.
WASH BOWL.
No. 327,094. Patented Sept. 29, 1885.
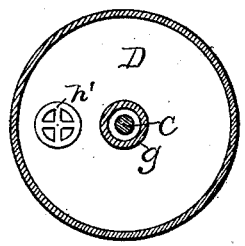
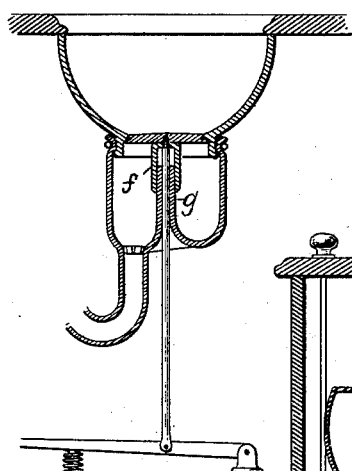
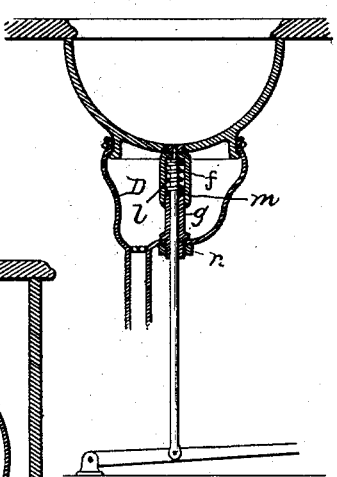
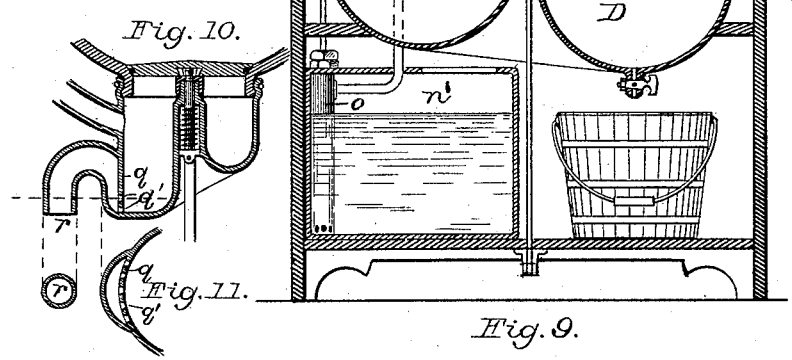
Attest:
Philip F. Larner
Lowell Bartle
Inventor:
Harvey C. Lowrie
By Wm C. Mnd
Attorney.

UNITED STATES PATENT OFFICE.

HARVEY C. LOWRIE, OF DENVER, COLORADO.

WASH-BOWL.

SPECIFICATION forming part of Letters Patent No. 327,094, dated September 29, 1885.

Application filed July 23, 1884. (No model.)

*To all whom it may concern:*

Be it known that I, HARVEY C. LOWRIE, of Denver, in the county of Arapahoe and State of Colorado, have invented certain new and useful Improvements in Wash-Bowls; and I do hereby declare that the following specification, taken in connection with the drawings furnished and forming a part of the same, is a clear, true, and complete description of the several features of my invention.

My said improvements have been specially devised with reference to their use with stationary or set bowls; but some of them are applicable to and are of practical value in connection with such portable wash-stands as are only connected with water-supply pipes, or with waste-pipes, or with neither of them, but are provided with set bowls which discharge their contents into removable pails or buckets, or beneath a car through openings in the bottom of the bowl.

The prime object sought by me is a mounted or set wash-bowl having a uniform interior earthenware or enameled finish, free from visible metallic fittings, and in the development of this feature I have devised various novelties in the construction, arrangement, and combination of various devices or parts of value in this connection, with a view to desirable sanitary conditions, cleanliness, and durability, as well as convenience and effectiveness in operation, and said novel features will be duly specified in the several clauses of claim hereunto annexed.

Figure 1:
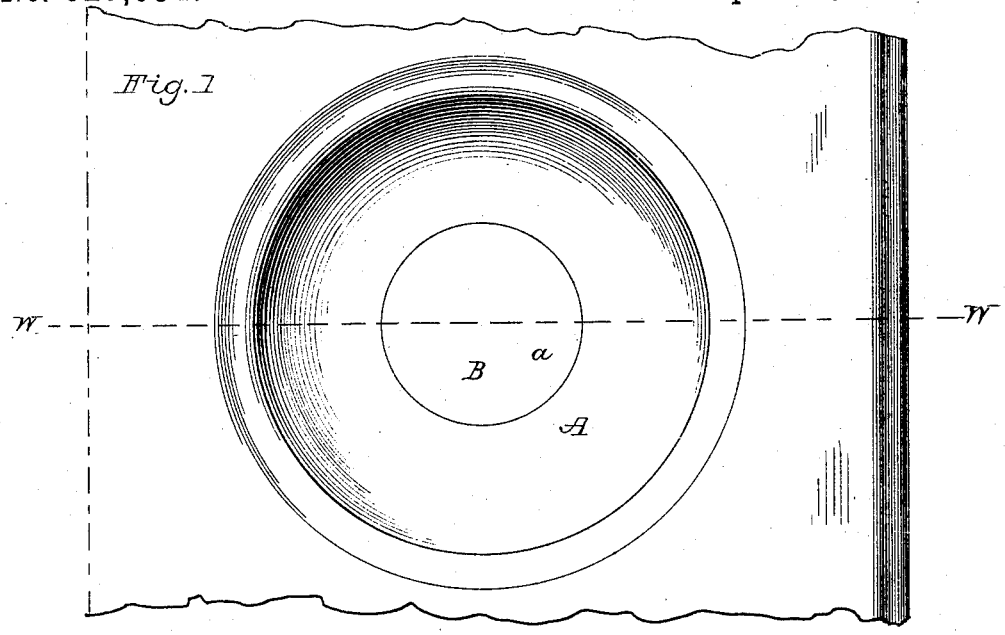
Figure 2:
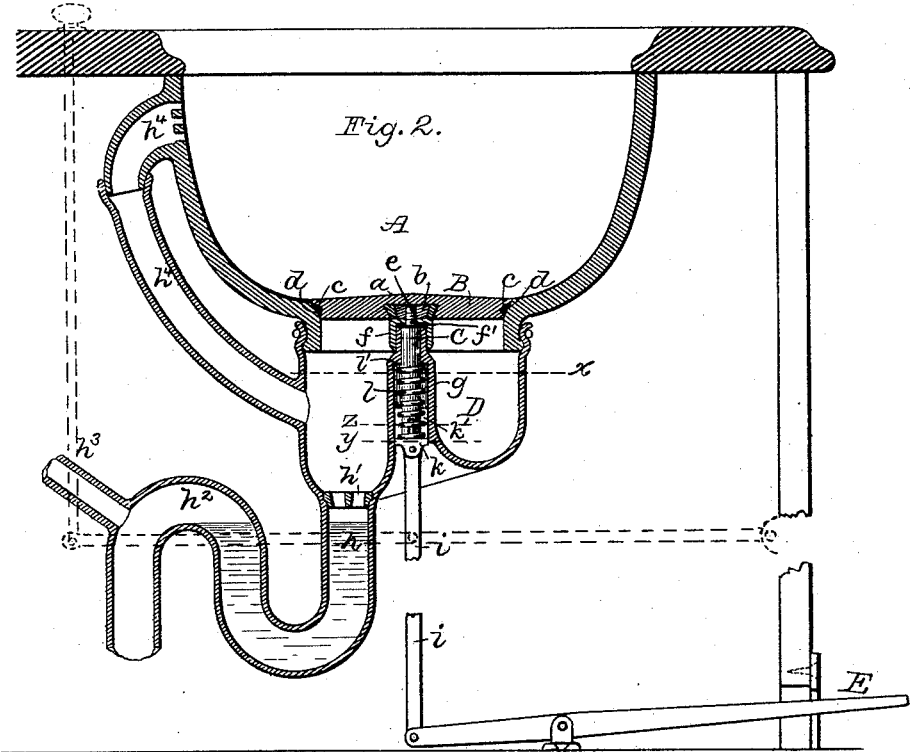

Referring to the drawings, Figure 1 is a top view of a stand and bowl containing my improvements in their best form. Fig. 2 is a vertical central section of the same on line $w$, Fig. 1. Fig. 3 is a horizontal section of Fig. 2 on line $x$. Figs. 4 and 5 are similar horizontal sections, respectively, on lines $y$ and $z$, Fig. 2. Fig. 6 is a side view of the plug-spindle detached. Fig. 7 is a sectional view of a bowl having a plug and spindle which are depressed for discharging, instead of raised, as illustrated in previous figures. Fig. 8 is a central section of a bowl having a plug, whether of metal or earthenware, of the ordinary size, as employed with certain portions of my invention. Fig. 9 illustrates in section a portable stand embodying a bowl with my improvements. Figs. 10 and 11 illustrate in vertical and horizontal section a wash-bowl having a trap in the waste-chamber as devised by me.

The basin or bowl A is composed either wholly of glass or earthenware, or of any suitable material covered with water-proof enamel, as a substitute for such ware. This bowl has an opening at its bottom, affording a plug-seat which is integral with the bowl, instead of a metallic plug-seat, as always heretofore used.

The plug B is novel in that it has an enameled or an earthenware surface, $a$, which corresponds in finish with the interior surface of the bowl. It is of such large diameter as to be in substance the bottom of the bowl, as distinguished from the usual metallic bushing and small metallic or flexible plugs heretofore employed. As an important result, my bowl has the neat and attractive appearance of the ordinary portable basin, and the objectionable corrosive metal fittings, as well as the unsightly collection of filth usually visible at the plug-hole, are wholly obviated. The plug B may be largely varied in construction without departure from certain portions of my invention; but I have here shown it to be composed of earthenware $a$, and having a socket at its under side, within which a nut, $b$, is securely housed or embedded by the aid of soft molten metal, or by other well-known means. The coincident edges of the plug and bowl are inclined, and the plug is provided with an annular recess, $c$, for the reception of an annular packing-ring, $d$, which can be a ring of very soft metal, or it may be composed of fibrous matter; but it is preferably an elastic ring of vulcanized rubber sprung into the recess.

Metallic plugs have heretofore been provided with packing, and the packing-ring $d$ performs the usual functions; but in this combination it also performs a novel and important function, in that it cushions the earthenware plug and bowl, so that neither is liable to breakage from the shock incident to sudden and forcible contact.

The basin and plug, Fig. 2, are so constructed that the plug is lifted for discharging; and it will be seen that a lift not much greater than the thickness of the plug will afford an annular waste-opening of such extensive area as will enable an unusually prompt discharge, which is obviously a matter of special value in hotel wash-rooms and on sleeping-cars. The plug-spindle C is provided with a threaded stem, e, at its upper end, which occupies the plug-nut b, and it also has a sleeve-nut, f, fitted to said stem, which performs the function of a set-nut for the plug-nut to be firmly set higher or lower on the spindle, as may be required. The said sleeve-nut also performs the function of a cap for guarding the upper end of any tubular guide-bearing in which the plug-spindle may be mounted.

Below the bowl I employ a waste-chamber, D, of novel construction, in that it is annular in form and contains a central vertical tube, g, within which the plug-stem is located, and for which it serves as a guide. This chamber D may be variously constructed without departure from certain portions of my invention, and it can be variously attached to the bowl. The prime feature of novelty is the central tube, open at its bottom, and extended upward to receive the plug-spindle and permit its free reciprocation, and at the same time to render leakage adjacent to the spindle practically impossible. The waste-chamber and tube may be separately constructed or integral, as here shown; but it should have an inclined bottom, to obviate undue deposits of filth, and a waste-outlet at one or more points, although one, as at h, will generally be sufficient. It is desirable that said outlet should have a detachable strainer, h', as shown. Said outlet in permanently-set basins communicates in the usual manner with a waste-pipe, $h^2$, having a trap, and also, if possible, there should be a connection with a ventilating-shaft, as at $h^3$. The usual overflow-pipe, $h^4$, may be variably connected, although, as here shown, it enters the waste-chamber.

As shown in Fig. 2, the basin-plug is lifted by means of a treadle-lever, E, which projects slightly outside the front of the usual casing, and which at its inner end is coupled to the plug-spindle by a link, i. The lower end of said spindle has a square head, k, secured thereto by a lateral screw, as seen in Fig. 6, or it may be made integral therewith. This head serves as a seat for the lower end of the expansive spiral spring l, which encircles the stem, and has an abutment for its upper end at an annular surface, l', within the tube g. The interior of said tube at its upper end is cylindrical, and snugly but freely receives the round plug-stem; but at and below the shoulder l' it is cylindrical and larger in diameter, affording a housing for the spring, and from that point downward, as at k', it is square in cross-section for properly receiving and guiding the square head of the stem and preventing it from rotation, as when it is desired to unscrew the plug from its stem, either for adjustment or for access to the waste-chamber. The outside of the tube g at its upper end is truly cylindrical for a distance a little greater than the lifting movement of the spindle, so that said tube is well housed within the sleeve-nut f, before described, thus having its upper end well guarded against leakage. To still further guard this point, and also for cushioning the sleeve-nut when the plug is lowered, a rubber packing-disk, f', is interposed between the top of said tube and the coincident interior surface of the sleeve-nut.

Although I prefer the use of the well-known treadle-lever, as shown, and make claim thereto in a certain combination, a pull or a push rod can be employed in lieu thereof, as indicated in dotted lines in Fig. 2, without departure from certain portions of my invention.

It will be obvious that the adjustability of the spring, due to the lengthwise adjustability of the spindle, or equivalent means, enables a degree of pressure as between the plug and basin to be obtained which will secure the proper tight joint, and also the cushioning effect desired, without liability of undue shocks and strains; and it is further obvious that the expansive force of the spring when at rest serves to tightly bind and hold the waste-chamber to the bowl, and whenever the spindle is forced upward it will be seen that the waste-chamber is all the more firmly held against the bowl, so that under all circumstances no destructive strains can affect the joint between the waste-basin and the bowl, either from the normal action of the spring or from operating the treadle.

In Fig. 7 certain features of my invention are illustrated in connection with a plug which is lowered for discharging the contents of the bowl, and therefore the inclination of the contact-surfaces is reversed from that shown in Fig. 2, and the several parts of the apparatus are correspondingly modified. In this case the tube g is of uniform internal diameter, and the spring is applied beneath the outer end of the treadle. The sleeve-nut f is somewhat longer than as shown in Fig. 2, and the top of the tube g is somewhat lower. It will be seen that if a small plug is desired it can be employed in connection with certain features of my invention—as, for instance, as shown in Fig. 8.

As here shown, the annular waste-chamber D has a central hole at its bottom, into which the lower end of the tube g is inserted, and wherein it is secured in a vertical position, and with a tight joint, by a shoulder on the tube, a thread below the shoulder, and a nut, these parts being put together in red lead in a manner well known. The sleeve-nut f is of greater length than is shown in the previous figures, and the brass spiral spring l is interposed between a rubber disk, m, on top of said tube and the inner upper surface of the sleeve-nut f, so that said spring forces the plug upward into its seat, and the disk serves as a water-tight packing at the annular space between the spindle and sleeve. The top of the tube g is higher than the level to which the water could possibly rise in the waste-chamber, because the outlet from the waste-chamber has a greater area of opening than the area of the waste-hole in the bowl. When the tube $g$ is constructed as shown, it can be made of non-corrosive metal, and a practically water-tight joint between it and the sleeve-nut can be readily obtained without the use of special packing.

For relieving the upward shock of the plug against its seat, the lower end of the spindle is threaded and provided with a nut, $n$, which also admits of a variable adjustment of the pressure of the plug-packing.

The value of my improvements in connection with portable wash-stands will be obvious from an inspection of Fig. 9, wherein the annular waste-chamber D is of considerable capacity and is provided with a waste-cock, by which the contents of said chamber can be retained, as in a practically air-tight vessel, until convenient for withdrawal; or, said cock being open, the waste water can flow directly into a bucket, as is common with portable wash-stands of this general class. For use in this connection I prefer that the annular chamber be either composed of earthenware or glazed cast-iron, so that its interior surface may be readily kept free from offensive deposits of solid matter. In their best form I prefer to provide such stands with a water-tank, $n'$, pump $o$, and conducting-pipe $p$, for delivering water into the bowl; but that arrangement forms no part of my invention.

The annular waste-chamber can be so constructed as to embody within it a water-seal trap, and thus obviate actual necessity for the usual outside goose-neck trap illustrated in Fig. 2—as, for instance, it will be seen on referring to Figs. 10 and 11 that a vertical diaphragm, $q$, is located as a wall between the interior of the waste-chamber and the mouth of the exit-pipe $r$. The wall $q$ at its bottom is laterally perforated, as at $q'$, to provide for the passage of fluids at points below the level of the neck of said exit-pipe. This diaphragm $q$ may be integrally formed with the waste-chamber, as is preferable, or it may be separately constructed and secured thereto by any obvious means, and be readily detachable, if desired.

All of these organizations contain that feature of my invention by which for the first time the valve-plug spindle is practically insulated from contact with the waste water and the liability of leakage reduced to a minimum.

Having thus described my invention, I claim as new and desire to secure by Letters Patent—

1. The combination of an earthenware bowl or basin having an integral plug-seat at a large central opening therein, a waste-chamber below said opening, and a large earthenware plug serving as a removable bottom to said bowl, and detachably mounted upon a vertically-sliding spindle, substantially as described, whereby the bowl may be promptly emptied, a metal bushing or plug-seat obviated at the bottom of the bowl, a uniform interior finish afforded, and the waste-chamber rendered easily accessible, as set forth.

2. The combination, with a wash bowl or basin, of an annular waste-chamber containing a central tube extending upward from the bottom thereof, and a waste-plug mounted upon a vertically-sliding spindle within and guided by said tube, substantially as described.

3. The combination of the bowl, the annular waste-chamber, the central tube, the waste-plug mounted on a sliding spindle within said tube, and the sleeve mounted on said spindle and inclosing said tube, substantially as described.

4. The bowl having the integral inclined plug-seat, the earthenware plug, and the recess in the edge of said plug containing ring-packing, in combination with the annular waste-chamber containing the central tube, the plug-spindle within said tube, and a spring for forcing the plug to its seat, substantially as described.

5. The combination of the bowl, the waste-chamber, the central tube within said chamber, the waste-plug, its spindle within said tube, the treadle for moving the plug from its seat, and the spring for forcing said plug to its seat, substantially as described.

6. The combination of the earthenware plug, its central nut embedded in its under side, the plug-spindle, the tube for said spindle, and the sleeve-nut on said spindle, which incloses the upper end of the tube, and also serves as a set-nut for the plug, substantially as described.

HARVEY C. LOWRIE.

Witnesses:
EDMUND P. MARTIN,
ANDREW RYAN.